Figure 1:
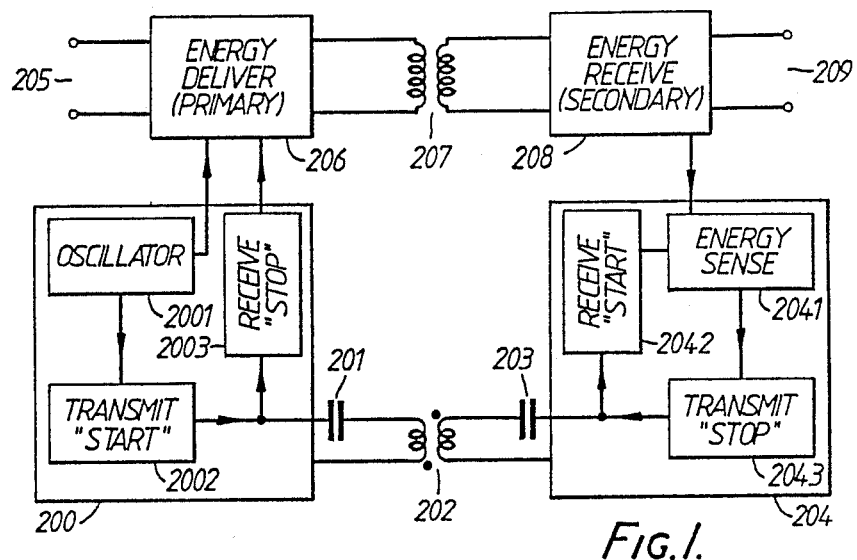

United States Patent [19]

Martin-Lopez

[11] Patent Number: 4,901,215
[45] Date of Patent: Feb. 13, 1990

[54] ISOLATED SWITCH MODE POWER SUPPLY CONTROLLER

[75] Inventor: Fernando Martin-Lopez, Santa Clara County, Calif.

[73] Assignee: Seagate Technology, Inc., Scotts Valley, Calif.

[21] Appl. No.: 244,493

[22] Filed: Sep. 14, 1988

Related U.S. Application Data

[63] Continuation of Ser. No. 207,460, Jun. 16, 1988, abandoned.

[30] Foreign Application Priority Data

Sep. 18, 1987 [GB] United Kingdom ............... 8722050

[51] Int. Cl.4 ............................................. H02M 3/28
[52] U.S. Cl. ....................................... 363/21; 363/26; 363/97
[58] Field of Search ..................... 363/17, 21, 26, 97, 363/98

[56] References Cited

U.S. PATENT DOCUMENTS 4,323,961  4/1982  Josephson ............................ 363/56
4,495,554  1/1985  Simi et al. ............................ 363/21
4,683,528  7/1987  Snow et al. .......................... 363/21
4,695,936  9/1987  Whittle ................................. 363/21
4,717,994  1/1988  Diaz et al. ............................ 363/17

FOREIGN PATENT DOCUMENTS 3040491  5/1982  Fed. Rep. of Germany ........ 363/21
  71270  5/1982  Japan ..................................... 363/21
1430137  3/1976  United Kingdom .

Primary Examiner—William H. Beha, Jr.
Attorney, Agent, or Firm—Flehr, Hohbach, Test, Albritton & Herbert

[57] ABSTRACT

An energy transfer arrangement in which a primary network transfers controlled quantities of energy to a secondary network. The primary network signals to the secondary network when it is about to initiate energy transfer and then initiates energy transfer until the secondary network responds to indicate to the primary network that energy transfer is to be terminated. The secondary network delays sending the primary network a termination signal for a period of time until the primary network is ready to receive the termination signal. The sequence of the primary network signalling the start of energy transfer, the primary network transferring energy, and the secondary network signalling the termination of energy transfer, is repeated indefinitely.

15 Claims, 6 Drawing Sheets

ISOLATED SWITCH MODE POWER SUPPLY CONTROLLER

This patent application is a continuation-in-part of U.S. Pat. application, Ser. No. 207,460, filed June 16, 1988 now abandoned.

The present invention relates to energy transfer arrangements in which energy is transferred in packets from an energy delivering subsystem to an energy receiving subsystem, particularly arrangements in which the two subsystems are to be maintained at significantly different voltage levels and it is desirable to isolate them electrically from each other.

Energy transfer arrangements in which energy is transferred in packets from one subsystem to another subsystem include switch mode power controllers which provide an output energy level controllable by controlling the size of each energy packet transferred. The energy level control may be such as to provide a constant output energy level in spite of varying conditions in the energy delivering subsystem or the control may be such as to vary the output energy level with some aspect of the environment in which the energy transfer arrangement is operating.

Known switch mode power controllers affect control of the size of each energy packet by generating a control pulse the duration of which depends on an error signal which represents the difference between the actual and the desired output energy levels, and switching on an energy delivering element of the arrangement for the duration of the control pulse.

Known switch mode power controllers are difficult to adapt to situations where complete isolation is required between the energy delivering sub-system and the energy-receiving sub-system because of the need to transfer at least one pulse of relatively long duration, usually the control pulse, across the isolation barrier with substantially no loss of fidelity.

The present invention provides an energy-transfer arrangement which is particularly suited to situations where isolation is required between its energy-delivering and energy-receiving sub-system but which has application where isolation of the parts is not required.

In accordance with the present invention, an energy-transfer arrangement includes an energy-delivering network, a control network arranged to control the energy-delivering network, an energy-receiving network arranged to receive energy from the energy-delivering network, and a monitoring network arranged to monitor the level of energy at the energy-receiving network, the control network being arranged to provide a start signal to the monitoring network immediately before the energy-delivering network starts delivering energy, the monitoring network being arranged, on receipt of the start signal, to monitor the level of energy at the energy-receiving network and to provide a stop signal to the control network when the energy at the energy-receiving network is at a set level, and the control network being arranged to stop the energy-delivering network delivering energy on receipt of the stop signal from the monitoring network.

Since the control of energy transfer is effected by an exchange of start and stop signals, the requirements for the isolation barrier as a data transmission network are simplified, the signals representing only the start and stop times of each energy transfer operation. In contrast, prior art isolated systems require that at least one isolation barrier should transmit pulses having the duration of the energy transfer operation in order to effect the control of energy transfer.

In one energy transfer arrangement, in accordance with the present invention, the control network is arranged to provide a start signal which represents single-digit binary data, and the monitoring network is arranged to monitor the energy level at the energy-receiving network by comparing the output voltage level of the energy-receiving network with a fixed reference voltage provided for the monitoring network.

Preferably, the control network is arranged to provide an abrupt change in the voltage level at a signal port as a start signal which represents single-digit binary data.

Preferably, the control network includes a switch device arranged to be driven through a direct switch-on path and an indirect switch-off path, effecting switch-on of the switch device for a duration dependent on the delay along the indirect switch-off path, for generating a start signal which represents single-digit binary data.

In an alternative energy transfer arrangement, in accordance with the present invention, the control network is arranged to provide a start signal which represents parallel-binary data, and the monitoring network is arranged to monitor the energy level at the energy-receiving network by comparing the output voltage level at the energy-receiving network with a reference level dependent on the value of the start signal passed from the control network to the monitoring network.

In the arrangement in which the control network provides start signals representing parallel binary data, the control network is arranged, preferably, to provide abrupt changes in the voltage levels at a plurality of signal ports as the start signal.

In the arrangement in which the control network provides start signals representing parallel binary data, the control network includes, preferably, a plurality of switch devices arranged to be driven through respective direct switch-on and indirect switch-off paths, effecting switch-on of the switch devices, as required, for durations dependent on the delays along the respective indirect switch-off paths, for generating the start signals.

In the arrangement in which the control network provides start signals representing parallel binary data, the control network may include a control input port through which a control signal is able to select one of the plurality of values of the start signals, and the monitoring network will include an arrangement for converting the start signals to a set voltage for use in the monitoring operation.

Preferably, the monitoring network is arranged to provide a stop signal which represents single-digit binary data in response to start signals representing either single-digit or parallel binary data, and, preferably, the monitoring network is arranged to provide an abrupt change in the voltage level at a signal port as the stop signals.

Preferably, the control and monitoring networks are each arranged to be responsive only to signals of the opposite polarity to the signals they transmit, and, advantageously, the control and monitoring networks are linked by means of a bi-directional communications network, arranged to invert signals transmitted along it, for conveying the stop and start signals.

Preferably, the bi-directional communications network includes a two-winding transformer with two turns on each winding, arranged to invert the signals passing through it, for each binary digit to be transmitted in a start signal. The transformer provides d.c. isolation.

There may, of course, be arrangements other than transformers for effecting signal inversion along the bi-directional communications network.

Preferably, the monitoring network includes means for delaying the stop signal, in order to minimise the possibility of the stop signal being sent to the control network while it is "deaf", that is, before the control network is ready to receive the stop signal.

Preferably, the control network includes an oscillator arranged to provide a sawtooth waveform voltage, the sloping part of which sets the maximum energy transfer period, and means for generating the start signals at about the terminations of the sloping parts of the waveform. This arrangement provides a start signal at about the termination of each sloping part of the sawtooth waveform prior to the start of the sloping part of the following sawtooth waveform and facilitates the transfer of zero energy by allowing the monitoring network to respond before power transfer begins during the following sawtooth waveform, when the energy-receiving network requires no energy transferred.

Preferably, the monitoring network includes a generator arranged to generate a ramp waveform on receipt of the start signal from the control network, means for terminating the ramp waveform when the energy at the energy-receiving network is at the set level, and means for generating the stop signal on the termination of the ramp waveform.

A primary network for an energy transfer arrangement, in accordance with the present invention, includes in combination, components which, with an attached capacitor-resistor circuit, form an oscillator for providing a sawtooth waveform voltage, a circuit arranged to generate a start signal as an abruptly changing voltage at about the end of each sloping part of the sawtooth waveform produced by the oscillator completed by an attached capacitor-resistor circuit, and means arranged to respond to the sawtooth waveform voltage and to a stop signal of polarity opposite to that of the start signal by generating a drive signal suitable for setting a switch means, for effecting energy transfer, to a closed condition for the periods between the beginning of each sloping part of the sawtooth waveform and the arrival of the stop signal, and is, preferably, formed as a monolithic integrated circuit.

A secondary network for an energy transfer arrangement, in accordance with the present invention, includes, in combination, components which, with an attached capacitor-resistor circuit, form a generator for providing a ramp waveform voltage on receipt of a start signal in the form of an abruptly changing voltage, and means arranged to generate a stop signal of polarity opposite to that of the start signal when the ramp waveform voltage reaches a set level, and is, preferably formed as a monolithic integrated circuit.

Arrangements in accordance with the present invention include switch mode electrical power controllers. A switch mode electrical power controller, according to the present invention, may be in any one of the standard forms (buck, boost, flyback, or forward, for example) and may be equipped with a single or double-ended output port. In an isolated switch mode electrical power controller, according to the present invention, energy transfer between the energy-delivering network and the energy-receiving network will take place through a two-winding power transformer and the exchange of the start and stop signals will be effected through a communications network including a signal transformer with two double-turn windings. At switch on, the energy-delivering network will be able to energise the monitoring network and there will then be no need for an isolated pilot supply for the monitoring network, and, the cycle by cycle control will provide rapid response to changes in the input conditions and to changes in demand. The energy-receiving and monitoring networks are, of course, required to operate at the frequency set by the control network, permitting the operating frequency to be varied over a wide range without any undesirable effects. The electrical power controller may, of course, be equipped with conventional over-current and over-voltage protection circuits which will prevent any serious damage in case of failure of any part of the communications circuits.

Figure 3:
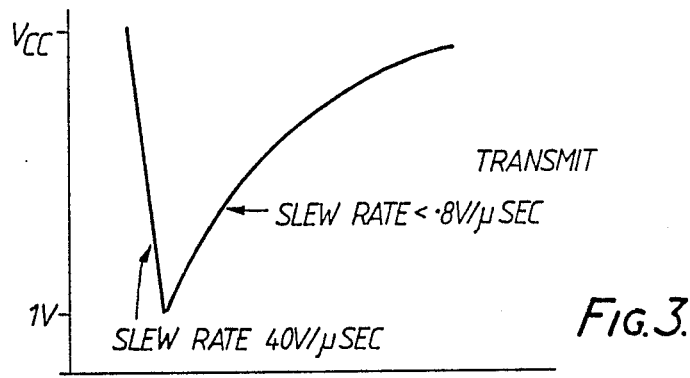
Figure 5:
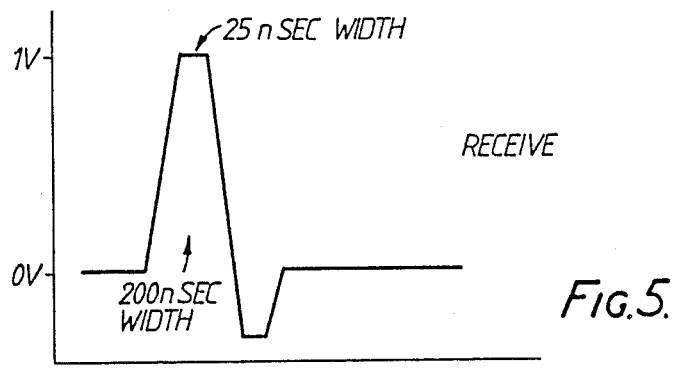
Figure 2:
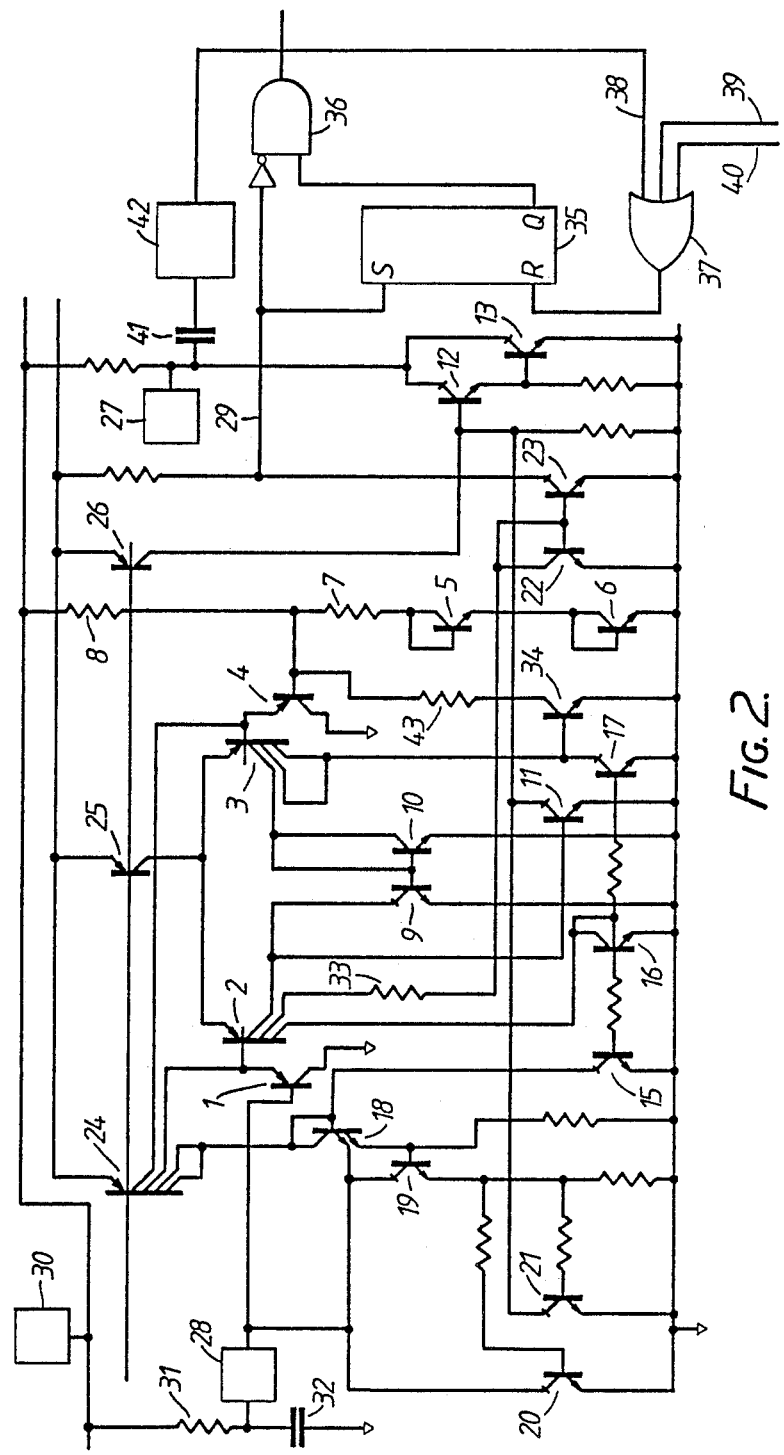
Figure 4:
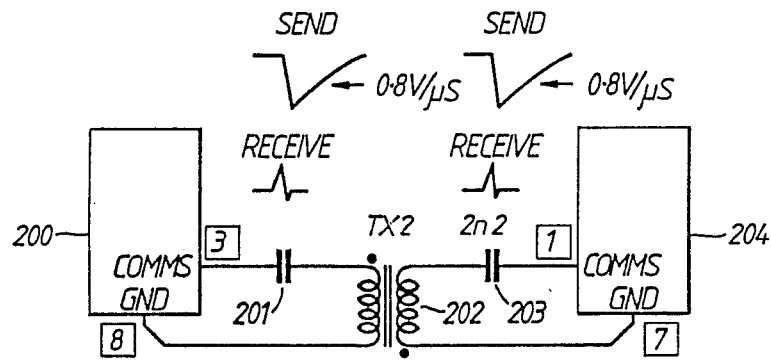
Figure 9:
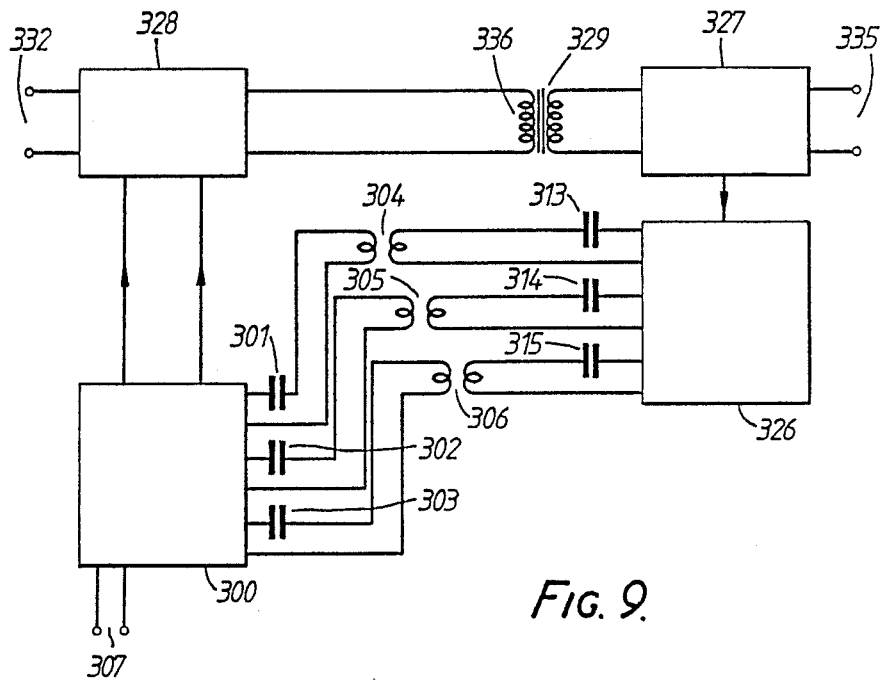
Figure 6:
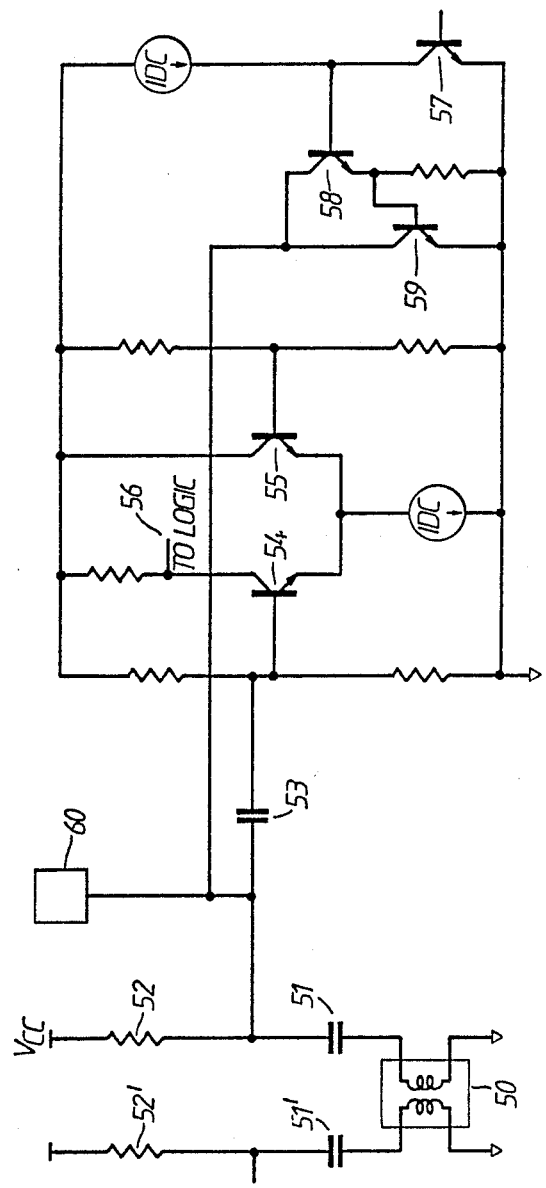
Figure 7:
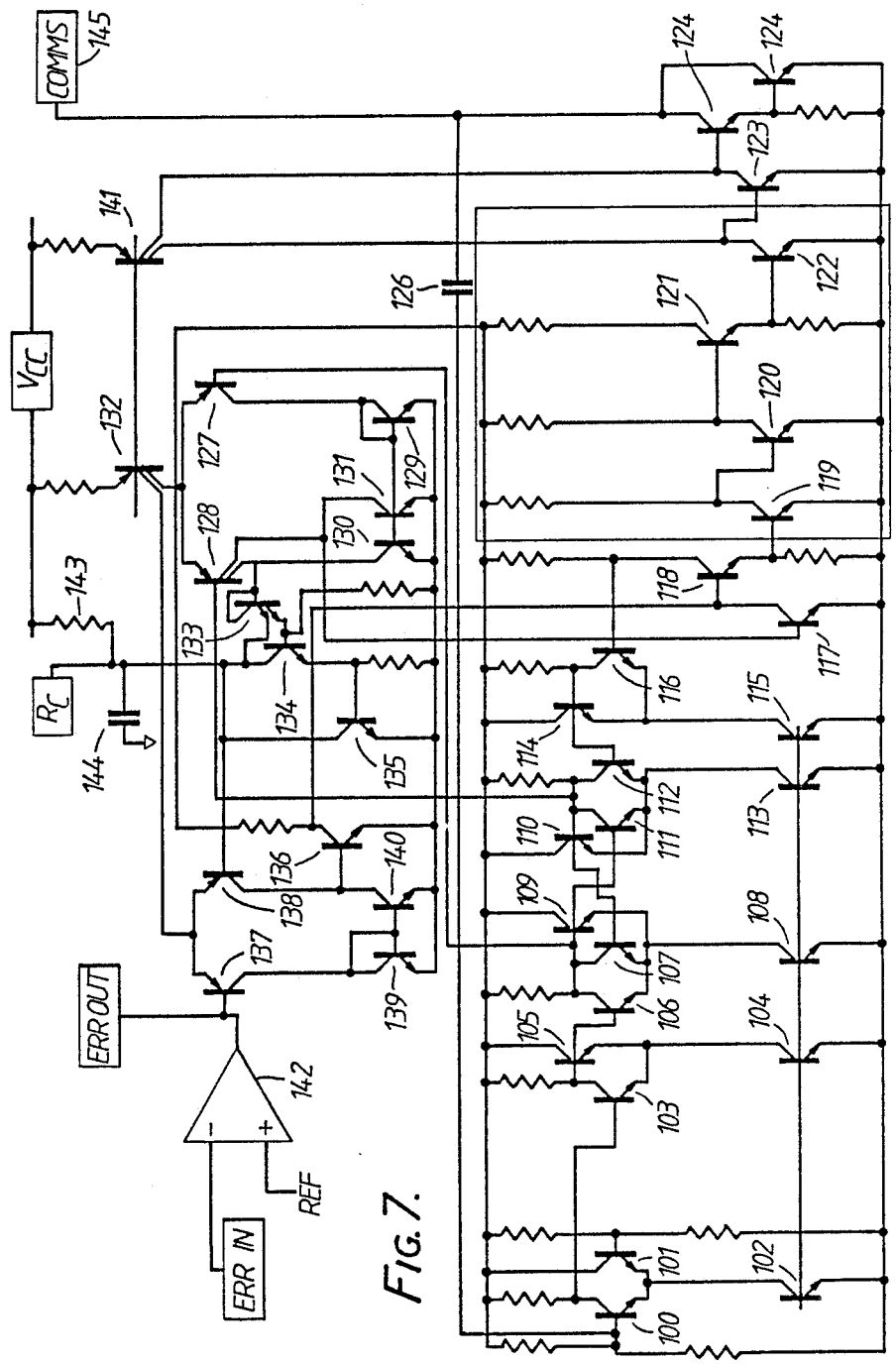
Figure 8:
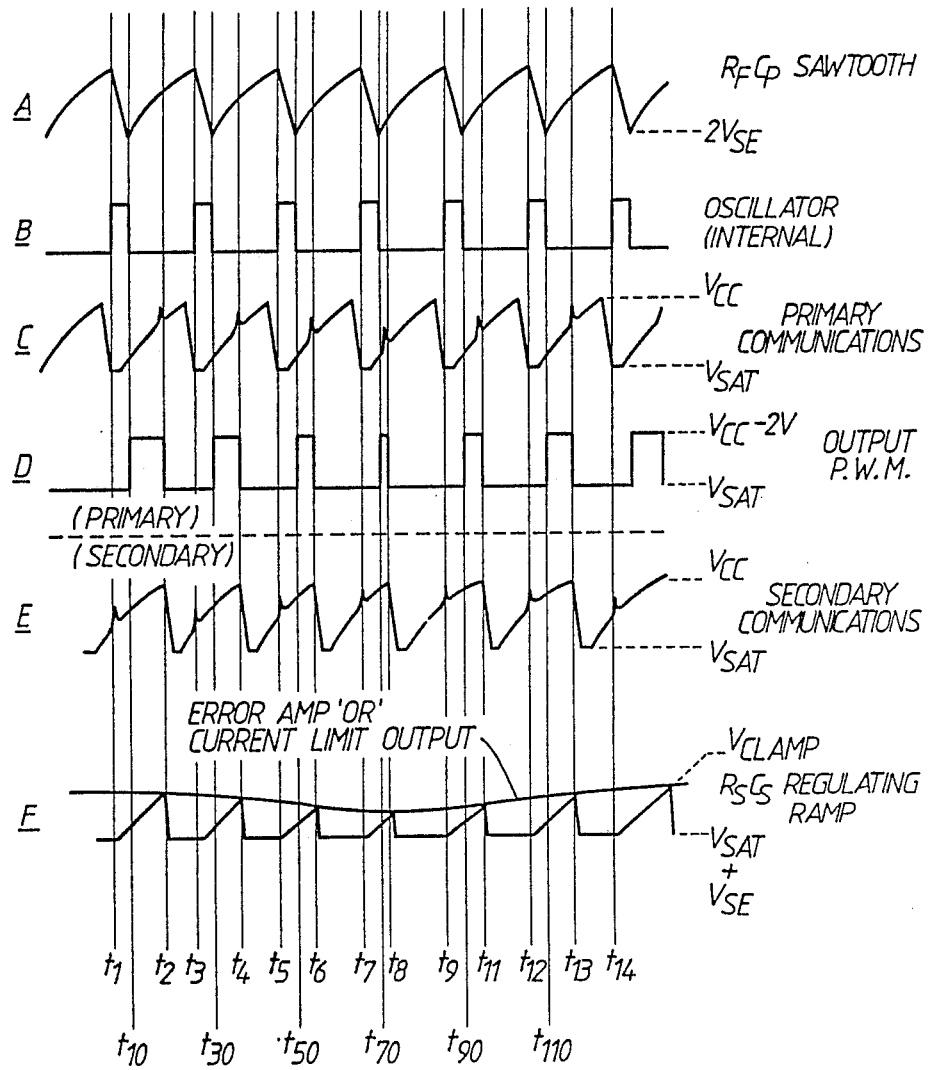

Energy-transfer arrangements, in accordance with the present invention, will now be described by way of example, only, and with reference to the accompanying drawings, in which:

FIG. 1 is a block diagram representation of a switch mode electrical power-control arrangement in accordance with the present invention, FIG. 2 a circuit diagram representation of a control network for the switch mode electrical power control arrangement of FIG. 1, FIG. 3 is a diagrammatic representation of a start signal as transmitted by the control network of FIG. 2, FIG. 4 is a diagrammatic representation of a control network and a monitoring network linked by a bidirection communications network for operation in the switch mode electrical power control arrangement of FIG. 1, FIG. 5 is a diagrammatic representation of the form of the start signal received by the monitoring network after the signal, as represented by FIG. 3, has traversed the communications network included in FIG. 4, FIG. 6 is a functional circuit diagram representation of the parts of the control network or the monitoring network, which interface with !the communications network and perform the bi-directional transmit and receive functions, FIG. 7 is a circuit diagram representation of a monitoring network of the switch mode electrical power control arrangement of FIG. 1, FIG. 8 is a diagrammatic representation of the principal waveforms of the control network of FIG. 2 and the monitoring network of FIG. 7, and, FIG. 9 is a block diagram representation of a general form of energy-transfer arrangement, in accordance with the present invention, employing multiple bi-directional communications paths.

Referring to FIG. 1, a switch mode electrical power control arrangement includes an input port 205, an energy-delivering network 206 coupled, by a two-winding power transformer 207, to an energy-receiving network 208 which has an output port 209, a control network 200 coupled, by means of a two-winding signal transformer 202 with coupling capacitors 201 and 203, to a monitoring network 204. The control network is made up of an oscillator circuit 2001, a transmit "start" circuit 2002, and a receive "stop" circuit 2003. The monitoring network is made up of an energy sensing circuit 2041, a receive "start" circuit 2042, and a transmit "stop" circuit 2043.

In the operation of the switch mode electrical power control arrangement of FIG. 1, an electrical energy source is connected to the input port 205 of the energy-delivering network 206 connected to the primary winding of the power transformer 207. The control network 200 is energised through the energy-delivering network 206 (the connection is not shown) and the oscillator 2001 begins operating, resulting first in the transmission of a "start"signal from the transmit "start" circuit 2002 and the delivery of energy into the primary winding of the transformer 207. Electrical energy is received by the energy-received network 208 from the secondary winding of the transformer 207 and the monitoring network 204 is supplied with energy (this connection is not shown). The "start" signal from the transmit "start" circuit 2002 is transferred by the capacitors 201 and 203, and the transformer 202 which inverts the signal, to the monitoring network 204 where the receive "start" circuit 2042 responds to the inverted "start" signal and switches on the energy sensing circuit 2041. When the energy-sensing circuit 2041 senses that the energy level at the energy-receiving network has reached the set level, it causes the transmit "stop" circuit 2043 to generate a "stop" signal which is transferred by the capacitors 201 and 203, and the transformer 202 which inverts the "stop" signal, to the control network 200 where the receive "stop" circuit 2003 responds to the inverted "stop" signal and switches off the energy-delivering network 206. The energy-delivering network 206 remains switched off until the start of the next oscillator cycle when the whole operation is repeated, and the electrical energy available at the output port 209 of the energy-receiving network 208 will be maintained at a level dependent on the set level at which the monitoring network 204 generates the "stop" signal. Referring to FIG. 2, the control network includes a clock oscillator made up of the transistors 1 to 6, 18, 19 and 20, the resistors 7 and 8, and the capacitor-resistor network 31–32. The transistors 9 to 13 and 21 belong to the part of the network for signalling, and the transistors 24 to 26 are provided as current sources for the various parts of the network. The transistors 22 and 23 form an output buffer amplifier for the clock oscillator the output signal of which appears at the port 29 of the network. The clock oscillator output signal is applied to the SET input port of a bistable flip-flop 35 and one input port of an AND gate 36. The Q output port of the bistable flip-flop 35 is connected to another input port of the AND gate 36 and the RESET input port of the bistable flip-flop 35 is connected to the output port of an OR gate 37. A capacitor 41 and a logic network 42 link the signal port 27 to an input port 38 of the OR gate 37. The oscillator of FIG. 2 operates by the charging and discharging of the capacitor 32. The capacitor 32 is charged from the supply voltage by way of the resistor 31 until a threshold voltage is reached, at which time the transistor 20 is switched on to discharge the capacitor 32. The threshold voltage is set by means of the resistors 7 and 8 and the transistors 5 and 6 at the base electrode of the transistor 4, and this threshold voltage acts as a reference voltage for the transistors 1 and 2 through the symmetrical arrangement of the transistors 1 to 4 and the shared current source 25. The transistors 1 and 2 are held in a conducting state during the charging phase of the capacitor 32 and act through the transistors 22 and 23 to produce a low output voltage at the output port 29. As the capacitor voltage reaches the threshold voltage the transistors 1 and 2 switch off and the transistor 20 is switched on through its connection by way of the transistors 15, 16, 18, and 19 and is connected to the current source 24. At the same time the transistor 17 is switched off through its connection with the collector electrode of the transistor 2 and this diverts current into the base electrode of the transistor 34 which is so connected to the transistors 3 and 4 as to pull the threshold voltage downwards through a resistor 43, thereby facilitating the discharge of the capacitor 32 during which time the output port 29 is at a high voltage level. The discharge phase of the capacitor 32 ends when its voltage falls below the low threshold voltage, at which time the threshold voltage returns to the starting value. The transistors 1 and 2 are again conductive, the output port 29 provides a low output voltage, and the capacitor 32 is again being charged, so the oscillator will repeat the cycle and continue to do so indefinitely. The output signal from the oscillator is applied to the SET input port of the bistable flip-flop 35 and the Q output signal from the bistable flip-flop 35 is applied to an input port of the AND gate 36, the other input port of the AND gate 36 receiving the oscillator output signal so as to provide an output drive signal with a maximum ON time equal to the ON period of the oscillator output signal and which output drive signal may be shortened by applying a signal to the RESET input port of the bistable flip-flop 35. The OR gate 37 provides RESET input signals for the bistable flip-flop 35 in accordance with input signals on its ports 38, 39 and 40. A signal from the signal port 27 reaches the input port 38 of the OR gate 37 by way of the capacitor 41 and the logic network 42. The logic network 42 is arranged to respond to the "stop" signal from the monitoring network after inversion, the signal on the input port 39 may come from an over-current sensor of the network, and the signal on the input port 40 may come from an arrangement for setting a maximum duration of the output drive signal. The bistable flip-flop 35 and the AND gate 36 may be included in the energy-delivering network rather than in the monitoring network.

Referring still to FIG. 2, as the transistors 1 and 2 are switched off immediately before the start of the discharge of the capacitor 32, the transistor 11 is switched off because of the interruption of the current flowing through the transistor 2, and current provided by the current source 26 now causes the transistors 12 and 13 to be switched on. Also, as the transistor 2 is switched off, the transistor 21 is switched on through its connection to the transistor 2 by way of the transistor 19, the transistor 18, the transistor 15, and the transistor 16. The turn-on of the transistor 21 has the effect of diverting the current from the current source 26 and turning off the transistors 12 and 13. The transistors 12 and 13 are therefore turned on initially when the transistor 11 turns off and are turned off very soon afterwards when the transistor 21 turns on. The period for which the transistors 12 and 13 are turned on is determined by the extent to which the signal delay through the transistors 16-15-18-19-21 exceeds the turn-on time of the transistor 11. The arrangement described for driving the transistors 12 and 13 produces a very brief fall in the voltage level at the signal port 27 this being the "start" signal, and, for most of the time, leaves the signal port 27 in the "listening" state.

The form of the signal produced by the brief switching-on of the transistors 12 and 13 of FIG. 2 is illustrated by FIG. 3. The signal consists of a fast falling edge, corresponding to the switch-on of the transistors 12 and 13, the rate of fall of which is of the order of 40 volts per microsecond, and a slowly rising edge the rate of rise of which is of the order of 0.8 volts per microsecond. The amplitude of each fall and rise is of the order of 1 volt less than the supply voltage to the transistors 12 and 13.

Referring to FIG. 4, in which the block 200 represents the control network, the "start" signal produced by the block 200 is applied to a pulse transformer 202 by way of a coupling capacitor 201 and is transferred to the monitoring network, represented by the block 204, by way of a coupling capacitor 203. Likewise, the "stop" signal is produced by the block 204 and transferred to the monitoring network 200 by way of the components 203, 202, 201. The pulse transformer is not required to preserve the shape of the "start" signal (or the "stop" signal) and may consist of two single-turn, or double-turn, windings formed on a ferrite core.

FIG. 5 illustrates a likely form of the output signal from the transformer 202 to the monitoring network 204, this being, in effect, a differentiated form of the signal illustrated by FIG. 3. As is illustrated by FIG. 5, the signal, now a pulse, received by the monitoring network 204, has an amplitude of about 1 volt and is about 200 nanoseconds wide at its base and about 25 nanoseconds wide at its apex. The signalling between the control and the monitoring networks is effected by the generation of the signal form illustrated by FIG. 3, by both the control and the monitoring networks, and the use, in both directions, of the coupling arrangement of the capacitors 201 and 203 and the pulse-transformer 202 illustrated by FIG. 3, providing bi-directional communication between the networks along a shared communication path.

Referring to FIG. 6, the transmit function is performed by the transistors 57, 58 and 59 and their associated components, the receive function is performed by the transistors 54 and 55 and their associated components, and the node 60 is common to both the signal transmitting and signal receiving parts of the network. The transformer 50 represents the pulse transformer which, with the capacitor 51, forms the coupling network. The resistor 52 acts as the load for the transistors 58 and 59.

Referring to FIG. 6, the transmission occurs when the transistor 57 is switched off, resulting in the Darlington-connected pair of transistors 58 and 59 being switched on, and, because of the very high gain of the Darlington-connected transistors 58 and 59, the voltage level at the node 60 slews downwards very fast (40-0V/S). The values of the capacitor 53 and the biasing resistors for the transistor 54 are so chosen that the transistor 54 does not respond to the fast negative going signal which is present at the node 60, the result being that the transmitted signal from the control network does not excite its own signal receiver, and the transmitted signal from the monitoring network does not excite its own signal receiver. The transistor 57 is switched on again soon after it was switched off but the change in voltage which this causes at the node 60 is so controlled by the capacitor 53 and the resistors around it as to give rise to a relatively slow trailing edge (0.8 S) to the transmitted signal, and, this slow trailing edge does not therefore affect the transistor 54. The negative-going transmitted signal with the fast leading edge and slow trailing edge is coupled into the transformer 50 by means of the capacitor 51. The transformer 50 differentiates and inverts the negative-going signals, shown in FIG. 3, to produce the waveform shown as FIG. 5.

As is shown in FIG. 6, the transformer 50 has identical networks 51-52 and 51'-52' connected to its windings, and, in addition (but not shown in FIG. 5) a further network identical to that comprising the capacitor 53 and the transistors 54 to 59 with their associated components is connected to the junction of the capacitor 51' and the resistor 52'. Considering the further network as consisting of a capacitor 53' and transistors 54' to 59' with their associated components, the positive pulse arriving by way of the capacitor 51' will be coupled by the capacitor 53' to the base electrode of the transistor 54' which will amplify and stretch the pulse and produce a negative-output pulse at its output port 56'. The positive input pulse will also reach the collector electrodes of the transistors 58' and 59' where it will have no noticeable effect. It will be evident, therefore, that a signal, as shown in FIG. 3, transmitted from the node 60 will be routed by the capacitor 51, the transformer 50, and the capacitor 51' to the receiver transistor 54' of a "mirror" transmit-receive unit without affecting the receiver transistor 54 of the transmitting unit, and, similarly, a signal, as shown in FIG. 3, transmitted by the "mirror" transmit receiver unit will be routed to the receiver transistor 54 without affecting the "mirror" receiver transistor 54'.

FIG. 7 represents a monitoring network and includes a practical form of the signalling arrangement illustrated by FIG. 6. The arrangement represented by FIG. 7 includes an error monitoring system comprising an error amplifier 142, a ramp generator pulse width modulation (PWM) arrangement comprising the transistors 127 to 140, the capacitor 144, and the resistor 143, for converting the output signal (the error signal) from the error amplifier 142 into a time duration signal, a latch arrangement comprising the transistors 106 to 113 with the transistors 114 to 118 for resetting the latch, the transmitting part of the signalling arrangement comprising the transistors 141 and 123 to 125 connected to the latch reset arrangement by way of a delay stage comprising the transistors 119 to 122, and the signal receiver part of the signalling arrangement comprising the capacitor 126 and the transistors 100 to 105. A reference voltage source is provided for the error amplifier 142 which is a differential-input amplifier. Operation of the monitoring network, represented by FIG. 7, is tied to the arrival, at the communications port 145, of a positive pulse (as shown in FIG. 5). Such a pulse, as is explained above, is received from a pulse transformer and a capacitor such as the pulse transformer 50 and the capacitor 51' of FIG. 6. The pulse is conveyed by the capacitor 126 to the transistor 100 which causes a positive pulse to appear at the base electrode of the transistor 106, and, since the transistor 106 is part of one arm of a latch arrangement which consists of the transistors 106 to 113, the latch arrangement is driven to the state in which the transistors 106 and 107 are switched on and the transistors 111 and 112 are switched off. The state of the transistors 106 and 107 is communicated to the transistor 127 and the state of the transistors 111 and 112 is communicated to the transistor 128 with the result that the transistor 127 is switched on and the transistor 128 is switched off. The switching off of the transistor 128 is communicated to the transistors 133 to 135 which are switched off also. The switching off of the transistor 135 allows the base electrode voltage of the transistor 138 to be controlled by the capacitor-resistor combination 143-144 where the capacitor 144 had previously been held in a discharged state as a result of the transistor 134 having been held in a conducting state by the transistors 133 and 128. As the capacitor 144 has no charge initially, the transistor 138 will be kept switched on when the transistor 135 switches off, and the transistor 136 will be kept switched on by the current through the transistor 138. The collector electrode of the transistor 136 is connected to the collector electrode of the transistor 117 which has the effect of preventing the transistor 117 from producing an output signal when the transistor 128 is switched off, the base electrode of the transistor 117 being connected to the collector electrode of the transistor 128. The transistor 138 is paired with the transistor 137 the base electrode of which is controlled by the error voltage amplifier 142, the error voltage being the difference between the desired output voltage as determined by the voltage reference of the error amplifier 142, and the actual output voltage delivered by the energy-receiving part of the network. Where the desired output voltage exceeds the actual output voltage, there will be a corresponding positive voltage at the base-electrode of the transistor 137 and this base electrode voltage of the transistor 137 will fall as energy is transferred from the energy-delivering part to the energy-receiving part of the network. Once the transistor 135 has been switched off, the capacitor 144 will be charged through the resistor 143 and the voltage at the base electrode of the transistor 138 will rise because the base electrode of the transistor 138 is connected to the junction of the capacitor 144 with the resistor 143. The transistor 137 will be held switched off while its base electrode voltage exceeds that of the transistor 138 with the result that the transistor 136 will be switched on and the transistor 118 switched off. When conditions have changed enough for the base electrode voltage of the transistor 138 to exceed the base electrode voltage of the transistor 137, switching-on of the transistor 137 and switching-off of the transistor 138 will take place, resulting in the switching-off of the transistor 136, switching-on of the transistors 118 and 119, and, by way of the transistors 120 to 123, switching-on of the transistors 124 and 125, producing a negative-going signal at the signal port 145. The switching-on of the transistor 118 is communicated also to the transistor 116 which switches on the transistor 112 causing the latch arrangement (transistors 106 to 113) to be reset with the transistors 111 and 112 switched on and the transistors 106 and 107 switched off. The change in the state of the latch arrangement causes the transistor 128 to be switched on, and, through the transistors 128, 133 and 134, the transistor 135 is switched on to discharge the capacitor 144. The switching-on of the transistor 128 also switches on the transistor 117 with the result that the transistors 124 and 125 are switched off by way of the transistors 118 to 123. The transistors 124 and 125 will therefore produce a short-duration negative voltage change at the signal port 145 at the time when the ramp voltage provided by the capacitor 144 equals the output voltage of the error amplifier 142, and, at that time, the latch arrangement will be reset and the network will be in its original state. The transistors 118 to 123 are used to delay the signal to ensure that it does not appear during the "deaf" times of the control network. The delay is a few hundred nanoseconds.

Referring still to FIG. 7, it will be evident that the upper limit of the output voltage from the error amplifier 142 must not exceed the supply voltage to the capacitor 144. In the situation where the actual output voltage of the energy-receiving part of the network exceeds the desired voltage, the error amplifier output voltage will be zero and the output-signal from the transistors 124 and 125 will be produced as the capacitor ramp waveform starts, thereby providing a condition of zero-energy transfer for the network for any operating cycles where the actual output voltage exceeds the desired output voltage.

Referring to FIG. 7, it will be noted that the signal port 145 is used both to receive signals from the control network and to send signals to the control network and that the transistors 124 and 125 are switched off very soon after being switched on when a signal is sent, so that this part of the network is in the state for receiving a signal for most of the time. Similarly, referring to FIG. 2, the signal port 27 is used both to send signals to the monitoring network and to receive signals from the monitoring network, the transistors 12 and 13 being switched off very soon after being switched on to send a signal so that this part of the network is able to respond effectively to the situation where the energy-receiving part of the network requires zero energy transferred.

Referring to FIG. 8, the waveform A represents the voltage at the port 28 of FIG. 2, the waveform B represents the voltage at the port 29 of FIG. 2, the waveform C represents the voltage at the port 27 of FIG. 2, and the waveform D represents the voltage at the output port of the AND gate 36 of FIG. 2. The waveform E represents the voltage at the port 145 of FIG. 7, the ramp part of the waveform F represents the voltage at the junction of the capacitor 144 and the resistor 143 while the curve joining the tips of the ramps represents the output voltage of the error amplifier 142, of FIG. 7.

Referring to FIG. 8, the charging and the discharging of the capacitor 32 in FIG. 2 provides the sawtooth waveform A which, through the action of the transistor chain connecting the port 28 to the port 29, is converted to the waveform B having a high level and a low level state in which low level state represents the maximum period of transferring energy from the energy-delivering part to the energy-receiving part of the network. At about the time $t_1$ the switching off of the transistors 1 and 2 of FIG. 2 near, or at, the termination of the sloping part of the sawtooth waveform A gives rise to the falling edge of the waveform C when the transistors 12 and 13 are switched on, which results in the pulse appearing on the rising edge of the waveform E about at the time $t_1$. The start of the ramp part of the waveform F also occurs at about the time $t_1$ which, it will be noted, is ahead of the start at the time $t_{10}$, of the energy transfer cycle. At the start of the energy transfer cycle, that is, at the time $t_{10}$, the bistable flip-flop 35 of FIG. 2 is set by the negative-going edge of the waveform B and the AND gate 36 provides the high level output as shown by the waveform D, causing energy transfer to the energy-receiving part of the network until the time $t_2$, at which the first ramp of the waveform F ends, and the accompanying signal produced by the transistors 124 and 125 of FIG. 7 gives rise to the pulse on the rising edge of the waveform C. This pulse on the rising edge of the waveform C is received at the port 27 of FIG. 2, and is routed by way of the capacitor 41, the logic arrangement 42, and the OR gate 37 to the bistable flip-flop 35, which is reset by the corresponding pulse produced by the OR gate 35. The resetting of the bistable flip-flop 35 closes the AND gate 36 and the output voltage of the AND gate falls to its low level at about the 35 time $t_2$ as shown by the waveform D. Energy transfer for this cycle therefore extends from the time $t_{10}$ to the time $t_2$. As can be seen for the periods $t_{30}$ to $t_4$, $t_{50}$ to $t_6$, $t_{70}$ to $t_8$, and $t_{90}$ to $t_{11}$, the duration of energy transfer varies under the influence of the error voltage, and, in fact, the duration of the energy-transfer period at each cycle is such as to reduce the error voltage to zero. In the situation where the error voltage is zero the required duration for the energy-transfer period is zero, which can be accommodated because there is time available between the occurrence of the "start" signal at time $t_1$, say, and the start of power transfer at time $t_{10}$, for the energy-receiving part of the network to provide the "stop" signal, i.e. the pulse at time $t_2$, say, will appear before time $t_{10}$ when zero energy transfer is required.

Referring to FIG. 9, a second embodiment of energy-transfer arrangement, in accordance with the present invention, employs multiple bi-direction communication paths and includes an energy-delivering network 328 provided with an input energy port 332, a control network 300 provided with a plurality of signal ports, an energy-receiving network 327 linked to the energy-delivering network by means of an isolating power transformer having windings 329 and 336, a monitoring network 326 having a plurality of signal ports, and a plurality of communications networks linking the signal ports of the control network 300 to the signal ports of the monitoring network 326. The control network 300 is capable of generating start signals having respective values selected according to the value of a control signal applied to a control input port 307. The monitoring network 326 is equipped with a converter for changing parallel binary data, provided as the start signal from the control network 300, into a reference voltage for use as the set energy level value in controlling the charging of the energy-receiving network 327. The control network 300 is linked to the energy-delivering network 328, and the monitoring network 326 is linked to the energy-receiving network 327. Each communications network includes a signal transformer having two single-turn, or double-turn, windings and a capacitor in series with each of the two windings, that is, the control network 300 is linked to the monitoring network 326 by a first communications network including capacitors 301 and 313 and a signal transformer 304, a second communications network including capacitors 302 and 314 and a signal transformer 305, and a third communications network including capacitors 303 and 315 and a signal transformer 306. Although, three communications networks are shown, there may be fewer or more than three such networks. The three communications networks shown are capable of transferring seven values of start signal (zero value is not needed) between the control and monitoring networks.

In the operation of the arrangement represented by FIG. 9, the control network 300 communicates with the monitoring network-energy-receiving network pair 326-327 by the use of start signals which are in the form of parallel binary data. The monitoring network 326 recognises the parallel binary data not only as a signal to start monitoring the energy level in the energy-receiving network 327 but also treats the data as information as to the level to which the energy-receiving network 327 is to be energised. The monitoring network 326 then monitors the level of energy in the energy-receiving network 327 and provides a stop signal when the energy level has reached the value indicated by the start signal. A control signal applied to the control input port 307 of the control network 300 is used to set the value of the start signal, and thereby, the energy level to which the monitoring network 326 will permit the energy-receiving network 327 to be energised. The energy transfer arrangement represented by FIG. 9 may be applied to the control of motors or lighting equipment, for example.

As has been described above, in respect of the manner in which communication is effected between the control and the monitoring networks, a pulse transformer capable of transmitting only events such as a rapid change in a voltage level or a very brief pulse provides a two-way communication path and inversion of the signal by the pulse transformer allows discrimination by each of the networks against its own signal, each event or pulse is of very short duration, representing minimum "deaf" time and permitting the execution of zero energy transfer duty cycles, a wide range of operating frequencies can be accommodated (50 Hz to 500 kHz), and the response to the "start" and "stop" signals is rapid because there is substantially no processing of these signals. The pulses may be "stretched" after being received without loss of information since the time of receipt will be retained as the leading edge of the stretched pulse. The information conveyed by the event or the pulse lies in its occurrence rather than in its form, so there can be no partial loss of information in the crossing of the isolation barrier as there would be in the case where the form and duration of a control pulse represent the control information which dictates the amount of energy to be transferred from a primary sub-system to a secondary sub-system at any time.

What is claimed is:

1. A switch mode power supply controller for use in a power supply of the type having a primary energy delivering network and a secondary energy receiving network, said switch mode power supply controller comprising:

a control network for controlling an amount of energy supplied by the primary network, the control network generating a start signal immediately before the primary network starts said energy supply function;

a monitoring network for monitoring an output voltage from said secondary network, the monitoring network transmitting a stop signal to said control network when the output voltage of said secondary network exceeds a pre-determined threshold, said monitoring network including a delay network means for delaying transmission of said stop signal to ensure that the stop signal is not sent before the control network is ready to receive said stop signal;

an electrically isolated communication path for transmitting said start and stop signals between said monitoring network and said control network; and said control network being responsive to the stop signal thereby causing said primary network to stop delivering energy to the secondary network upon receipt of said stop signal.

2. A switch mode power supply controller as in the claim 1, wherein a time period between the generation of said start signal by said control network and beginning of the energy supply function is defined as a power on delay, said power on delay having a duration sufficiently long to allow both the transmission of the start signal to the monitoring network and the transmission of the stop signal from the monitoring network to the control network, thus facilitating the transfer of no energy to the secondary network when no output energy is required.

3. A switch mode power supply controller as claimed in claim 1, wherein said control network includes a first signal port for transmitting said start signal to said monitoring network and for receiving said stop signal from said monitoring network, wherein said first signal port is only responsive to stop signals having a polarity opposite to the polarity of the start signal.

4. A switch mode power supply control as claimed in claim 3, wherein said monitoring network includes a second signal port for transmitting said stop signal to said control network and for receiving said start signal from said control network, wherein said second signal port is only responsive to start signals having polarity opposite to the polarity of the stop signal.

5. A switch mode power supply controller as claimed in claim 1, wherein said start and stop signals comprise single-bit binary data, having durations independent of the length of time during which said primary network delivers energy to the secondary network.

6. A switch mode power supply controller as claimed in claim 5, wherein said control network includes a switch device for generating said start signal, the switch device having a direct switch on path and an indirect switch off path, the duration of said start signal being dependant solely on the delay along the indirect switch off path.

7. A switch mode power supply controller as claimed in claim 1, wherein the control network includes an oscillator that provides a sawtooth waveform voltage having an upward sloping portion and a downward ramping portion, wherein the duration of said upward sloping portion defines the maximum period of time per cycle of said sawtooth waveform voltage signal during which the primary energy delivering network can supply energy to the secondary energy receiving network.

8. A switch mode power supply controller as claimed in claim 1, wherein the monitoring network comprises:
means for generating a ramp waveform an receipt of said start signal from said control network,
means for terminating said ramp waveform when the energy at the secondary is at the pre-determined threshold, and
means for generating said stop signal in response to the termination of said ramp waveform.

9. A switch mode power supply controller as claimed in claim 1, wherein said electrical isolated communication path is a bi-directional communications network arranged to invert the polarity of said stop and start signals as said start and stop signals are transmitted thereover.

10. A switch mode power supply controller as claimed in claim 1, wherein said electrically isolated communication path includes a two-winding transformer having at least two turns on each winding.

11. A switch mode power supply controller for use in a power supply of the type having a primary energy delivering network and a secondary energy receiving network, said switch mode power supply controller comprising:
(1) a control network for controlling an amount of energy supplied by the primary network, the control network including:
(a) means for generating a start signal immediately before the primary network starts said energy supply function, there being a power on delay defined as the time period between the generation of said start signal and beginning of said energy supply function,
(b) a first signal port for transmitting said start signal;
(2) a monitoring network for monitoring an output voltage from said secondary network the monitoring network including:
(a) means for transmitting a stop signal to said control network when the output voltage of said secondary network exceeds a pre-determined threshold,
(b) a delay network means for delaying transmission of said stop signal to ensure that the stop signal is not sent before the control network is ready to receive said stop signal,
(c) a second signal port for transmitting said stop signal to said control network and for receiving said start signal from said control network;
(3) an electrically isolated communication path for transmitting said start and stop signals between said monitoring network and said control network;
wherein said first signal port is only responsive to stop signals having a polarity opposite to the polarity of the start signal;
said control network being responsive to the stop signal thereby causing said primary network to stop delivering energy to the secondary network upon receipt of said stop signal; and
said power on delay having a duration sufficiently long to allow both the transmission of the start signal to the monitoring network and the transmission of the stop signal from the monitoring network to the control network, thus facilitating the transfer of no energy to the secondary network when no output energy is required.

12. A switch mode power supply controller as claimed in claim 1, wherein said control network includes a switch device for generating said start signal, the switch device having a direct switch on path and an indirect switch off path, the duration of said start signal being dependent solely on the delay along the indirect switch off path.

13. A switch mode power supply controller as claimed in claim 1, wherein the control network includes an oscillator that provides a sawtooth waveform voltage including a sloping portion, wherein said sloping portion defines the maximum period of time per cycle of said sawtooth waveform voltage signal during which the primary energy delivering network can supply energy to the secondary energy receiving network.

14. A switch mode power supply controller as claimed in claim 1, wherein the monitoring network comprises:
means for generating a ramp waveform on receipt of said start signal from said control network,
means for terminating said ramp waveform when the energy at the secondary is at the pre-determined threshold, and
means for generating said stop signal in response to the termination of said ramp waveform.

15. A switch mode power supply controller for use in a power supply of the type having a primary energy delivering network and a secondary energy receiving network, said switch mode power supply controller comprising:
(1) a control network for controlling an amount of energy supplied by the primary network, the control network including:

(a) means for generating a start signal immediately before the primary network starts said energy supply function, there being a power on delay defined as the time period between the generation of said start signal and beginning of said energy supply function, (b) a first signal port for transmitting said start signal, (c) a switch device for generating said start signal, the switch device having a direct switch on path and an indirect switch off path, the duration of said start signal being dependant solely on the delay along the indirect switch off path, (d) an oscillator that provides a sawtooth waveform voltage having an upward sloping portion and a downward ramping portion, wherein the duration of said upward sloping portion defines the maximum period of time per cycle of said sawtooth waveform voltage signal duration which the primary energy delivering network can supply energy to the secondary energy receiving network;

(2) a monitoring network for monitoring an output voltage from said secondary network, the monitoring network including:

(a) means for transmitting a stop signal to said control network when the output voltage of said secondary network exceeds a pre-determined threshold, (b) a delay network means for delaying transmission of said stop signal to ensure that the stop signal is not sent before the control network is ready to receive said stop signal, (c) a second signal port for transmitting said stop signal to said control network and for receiving said start signal from said control network, (d) means for generating a ramp waveform an receipt of said start signal from said control network, (e) means for terminating said ramp waveform when the energy at the secondary is at the predetermined threshold, (f) means for generating said stop signal in response to the termination of said ramp waveform; and (3) an electrically isolated communication path for transmitting said start and stop signals between said monitoring network and said control network;

wherein said first signal port is only responsive to stop signals having a polarity opposite to the polarity of the start signal;

said control network being responsive to the stop signal thereby causing said primary network to stop delivering energy to the secondary network upon receipt of said stop signal; and said power on delay having a duration sufficiently long to allow both the transmission of the start signal to the monitoring network and the transmission of the stop signal from the monitoring network to the control network, thus facilitating the transfer of no energy to the secondary network when no output energy is required.

* * * * *